(12) United States Patent
Lindström et al.

(10) Patent No.: US 7,143,701 B2
(45) Date of Patent: Dec. 5, 2006

(54) COLLAPSIBLE TABLE ARRANGEMENT FOR VEHICLES

(75) Inventors: Martin Lindström, Gothenburg (SE); Volker Stein, Wiesbaden (DE)

(73) Assignee: Lear Corporation, Southfield, MI (US)

( * ) Notice: Subject to any disclaimer, the term of this patent is extended or adjusted under 35 U.S.C. 154(b) by 391 days.

(21) Appl. No.: 10/738,611

(22) Filed: Dec. 17, 2003

(65) Prior Publication Data

US 2005/0045071 A1    Mar. 3, 2005

(30) Foreign Application Priority Data

Dec. 21, 2002   (DE) ................................ 102 60 503

(51) Int. Cl.
*A47B 23/00*        (2006.01)

(52) U.S. Cl. ........................................ 108/44; 297/145

(58) Field of Classification Search ................ 108/44, 108/42, 45; 297/145, 150, 154, 160, 162, 297/161, 188.15, 188.16, 188.17, 135
See application file for complete search history.

(56) References Cited

U.S. PATENT DOCUMENTS

| | | | | |
|---|---|---|---|---|
| 3,547,488 A * | 12/1970 | Barnes | ................. | 297/162 |
| 3,583,760 A * | 6/1971 | McGregor | ................. | 297/145 |
| 3,632,161 A * | 1/1972 | Arfaras et al. | ................. | 297/145 |
| 4,834,449 A * | 5/1989 | Engelman | ................. | 297/145 |
| 4,852,940 A | 8/1989 | Kanigowski | | |
| 4,944,552 A * | 7/1990 | Harris | ................. | 297/145 |
| 5,087,096 A * | 2/1992 | Yamazaki | ................. | 297/145 |
| 5,174,533 A * | 12/1992 | Pryor et al. | ................. | 248/288.51 |
| 5,547,247 A * | 8/1996 | Dixon | ................. | 297/145 |
| 5,588,697 A * | 12/1996 | Yoshida et al. | ................. | 108/160 |
| 5,697,666 A * | 12/1997 | Hanemaayer | ................. | 296/164 |
| 6,073,997 A * | 6/2000 | Koh | ................. | 297/162 |
| 6,086,129 A | 7/2000 | Gray | | |
| 6,347,590 B1 | 2/2002 | D'Annunzio et al. | | |
| 6,375,257 B1 * | 4/2002 | Wooding et al. | ................. | 297/162 |
| 6,427,957 B1 | 8/2002 | Finneman et al. | | |
| 6,746,069 B1 * | 6/2004 | McKenzie | ................. | 296/63 |
| 6,994,031 B1 * | 2/2006 | Huang | ................. | 108/42 |
| 2004/0227042 A1 * | 11/2004 | Welles et al. | ................. | 248/229.15 |

FOREIGN PATENT DOCUMENTS

| | | |
|---|---|---|
| DE | 40 08 512 A1 | 10/1990 |
| DE | 296 03 294 U1 | 6/1996 |
| DE | 197 05 754 A1 | 8/1998 |
| DE | 100 26 561 A1 | 12/2001 |
| EP | 0 380 429 A1 | 8/1990 |
| WO | WO 00/21793 | 4/2000 |

* cited by examiner

*Primary Examiner*—Jose V. Chen
(74) *Attorney, Agent, or Firm*—Brooks Kushman P.C.

(57) ABSTRACT

A vehicle collapsible table (28) unfoldable from a vertical rest position between rear seats to a horizontal use position. The table includes a swivel hinge having a profile claw (9) gripping around the edge region of the table board (8) with the said profile claw being attached to a rotary device for swivelling about a swivel axis (11, 34), orientated parallel to the edge (10) gripped around by a profile claw (9), through an angle of approximately 90° such that the table board (28) can be rotated through a rotational angle of approximately 90° about an essentially horizontal rotational axis (15).

13 Claims, 3 Drawing Sheets

COLLAPSIBLE TABLE ARRANGEMENT FOR VEHICLES

BACKGROUND OF THE INVENTION

1. Field of the Invention

The invention relates to a collapsible table arrangement for vehicles in which the collapsible table can be drawn out of a vertically orientated rest position, in particular within a multifunction console between the outer rear seats of a car and can be unfolded into its horizontally orientated usage position.

2. Background Art

From the German Utility Model 296 03 294 U1 a collapsible table arrangement has been made known which is arranged on the central console of a motor vehicle. To achieve this, on two opposing face walls on the inside of the console connecting link guides are fitted, to each of which a table board section is assigned. In the inserted state the table board sections lie vertically in a free space of the console which for example can be filled out with a removable storage box which can be closed by a cover flap. To obtain a table top, the cover flaps are opened and a table board is drawn out. Due to restricted guidance by means of spigots, a swivel movement of the table board section into the position for use is executed simultaneously as it is pulled out. In this respect, two connecting link guides support the table board and locking occurs in the connecting link guide. Lowering the table boards occurs in the reverse sequence. Disadvantages are the space required by the connecting link guides and the rigid table alignment, which in this way can only be used as a storage area next to the passenger.

Other shelf-type tables are known in conjunction with central consoles of vehicles, for example from U.S. Pat. No. 6,086,129 and WO 00/21793. The latter publication describes a central console out of which a shelf-type table composed of two sections can be swivelled to the side, whereby the sections are moved by means of a parallelogram lever system. In the swivelled-out state the table halves lie overlapping, stepwise offset. Such a part can hardly be used as a table and its value at the most lies in the enlarged shelf-storage possibilities.

U.S. Pat. No. 6,086,129 describes a central console between the front seats of a car. To the side of the console vertically orientated accommodation compartments for table boards are provided in which these can be inserted standing upright. By lifting and pulling out the table boards from the accommodation compartments and unfolding into a horizontal position, a table extending to the side in the region in front of the passenger appears which is held by clamping firmly in the accommodation compartment. The table is inflexible, handling difficult and the insertion and withdrawal is not ergonomic.

Similar problems arise with the handling of a collapsible table, as disclosed in DE 100 26 561 A1. The table arrangement described here is particularly assigned to the driver and consists of an accommodation housing for the boards arranged to the side near the driving seat, the boards being withdrawn for use and unfolded into the horizontal position about a hinge. The accommodation housing itself is swivelled vertically upwards and forms a type of table base. The system is complicated and needs much space.

SUMMARY OF THE INVENTION

The object of this invention is the provision of a table of the generic type which can be unfolded to the side, which with an adequate size can be completely folded away by easy mechanical handling and in particular lowered into the inside of a multifunction box which is accessible to the passengers on the rear seats of a car.

For the solution of the object a collapsible table arrangement for vehicles is suggested which according to the invention is characterised by a swivel hinge, consisting of a profile claw gripping around the edge region of the table board, the said profile claw being attached to a rotary device for swivelling about a swivel axis, orientated parallel to the edge gripped around by the profile claw, through an angle of approximately 90°, with the aid of which the profile claw together with the table board can be rotated through a rotational angle of approximately 90° about an essentially horizontal rotational axis, orientated transverse to the swivel axis of the profile claw.

The arrangement of the collapsible table according to the invention enables the table to be folded away and unfolded by rotation about only one point. In this way handling the table becomes noticeably easier and the space required in the rest position is less. All the components needed for swivelling the table are combined in the one rotary device which is realised to be sufficiently stable to withstand the stresses occurring. The rotation of the table in two levels, one vertically above the other, by approximately 90° in each case, enables all the necessary adjustments to be made, also without complicated connecting link guides. The rotary device is economical to produce and completely fulfils the requirements.

At the same time it has proven to be especially favourable if, according to another feature of the invention, the table board can be moved steplessly within the profile claw and parallel to the swivel axis between two end stops. The movement capability enables on one hand space-saving folding away and storage of the table board in the rest position and on the other hand enables user-friendly adjustment of the table during use. The movement within the profile claw is technically easy to achieve and the end settings of the movement paths are limited by end stops.

According to a favourable feature of the invention, the rotary device consists of two coaxially arranged parts, of which the fixed part is attached to a frame joined to the vehicle and the other part opposite the fixed part can be rotated about the common horizontal central axis, whereby the rotational movement of the rotary part is limited by end stops in the fixed part. The frame which is joined to the vehicle can be part of an armrest or a multifunction box, or also part of a load-bearing structure within a multifunction box, which is itself permanently coupled to the vehicle. Since the collapsible table only needs to be swivelled from one end position (rest position) into the other end position (position ready for use), the rotary movement can be defined by end stops which provide additional stability in the two end settings.

It is particularly favourable if the rotatable part is formed pot-shaped and is guided with its inner circumference on the outer circumference of the essentially disc-shaped fixed part and/or is guided on a central pivot which is formed on the fixed part and passes through the rotary part. With this type of design the collapsible table arrangement can be realised in a very stable, but simple manner.

It is advantageous if one half of the swivel hinge, formed together with the profile claw, is formed on the outer circumference of the rotary part and a groove, orientated to the rotational axis with constant radial distance, is provided on the bottom in the pot-shaped part, the extent of the circumference of the groove corresponding to the rotated angle of the rotary part and the groove being penetrated by a pivot provided on the fixed part such that the ends of the groove form the two end stops for the rotational movement of the rotary part.

Similarly, in a development of the invention, for the secure positioning of the table, a lock, which can be moved radially against spring pressure, is provided on the fixed or movable part, the said lock being latched into an appropriate recess on the other part in each case once the rotary device has reached a specified rotational position. The lock is, for example, formed as a spring-loaded bar which is guided on the fixed part in a radially extending groove. When an appropriately formed recess in the inner circumference of the rotary part passes the bar, it engages and blocks further rotation of the rotary part and therefore also blocks rotation of the table held in the profile claw. The table can then only be moved in the direction of its longitudinal edge.

To hold the table statically in its position ready for use and to prevent it from folding down, in an especially favourable embodiment of the invention, a tensile panel is supported for swivelling about an axis running parallel to the swivel axis on the side of the profile claw facing away from the collapsible table, so that the swivel hinge protrudes overlapping in the region of the rotary device, where the tensile panel in the usage position of the table interlocks an abutment provided on the rotary device, thereby forming a tension link as abutment for the collapsible table. The tensile forces acting on the collapsible table are therefore securely accommodated and further support of the freely projecting table can be omitted.

In a further development of this retention device for the collapsible table, the tensile panel exhibits at least one recess, which grips behind a cam formed on the rotary part or on the half of the swivel hinge assigned to the rotary part when the collapsible table is unfolded into its usage position. Preferably, two of these cams are in each case assigned to one of two recesses in order to securely bear the weight of the table and the objects placed on it.

The tensile panel latches automatically when the collapsible table is unfolded into its usage position. To fold up the table, according to the invention, the tensile panel is moved by means of a guide surface formed on the cam from its interlocking position. Preferably, the tensile panel should be arranged and dimensioned such that swivelling of the table is only allowed when the collapsible table is in the vertical position, which corresponds to its later rest position.

If, for example, the collapsible table is to be swivelled into a closely defined accommodation slot, such as inside a multifunction box, then the vertical position of the table board must be attained already above the accommodation opening. In order to achieve this, the invention provides for the tensile panel to simultaneously unlatch the interlock, which is radially movable against spring pressure, when the table is swivelled up. For this purpose, the tensile panel presses against a protrusion provided on the bar and presses the bar out of its latching position at the end of the swivelling movement of the table. In this way, the swivelling feature of the rotary device and of the swivel hinge is only released when the collapsible table has achieved its vertical position. The spring force of the bar is here noticeably overcome.

The invention can be particularly favourably applied if the swivel hinge is arranged on a multifunction box between two seats in a car and the tables can be lowered in a vertical position between the housing of the multifunction box and a compartment formed within the multifunction box, preferably a cooler box. The arrangement is extremely space-saving so that only very little storage space or cooling space in the multifunction box is lost. The strong load-bearing structure of a frame provided in the multifunction box gives the swivel hinge the necessary hold and the required stability.

Advantageously, the multifunction box can be arranged between the outer rear seats of a car so that the tables can be brought out after opening the armrest closing the multifunction box.

If desired or required, each of the tables can be divided in two and using a folding mechanism, can be folded into a position appropriate to the rest position in which the table halves lie closely one above the other.

An embodiment of the invention is illustrated in the drawing and is described in the following. The following are shown:

DETAILED DESCRIPTION OF THE PREFERRED EMBODIMENT(S)

Figure 1:
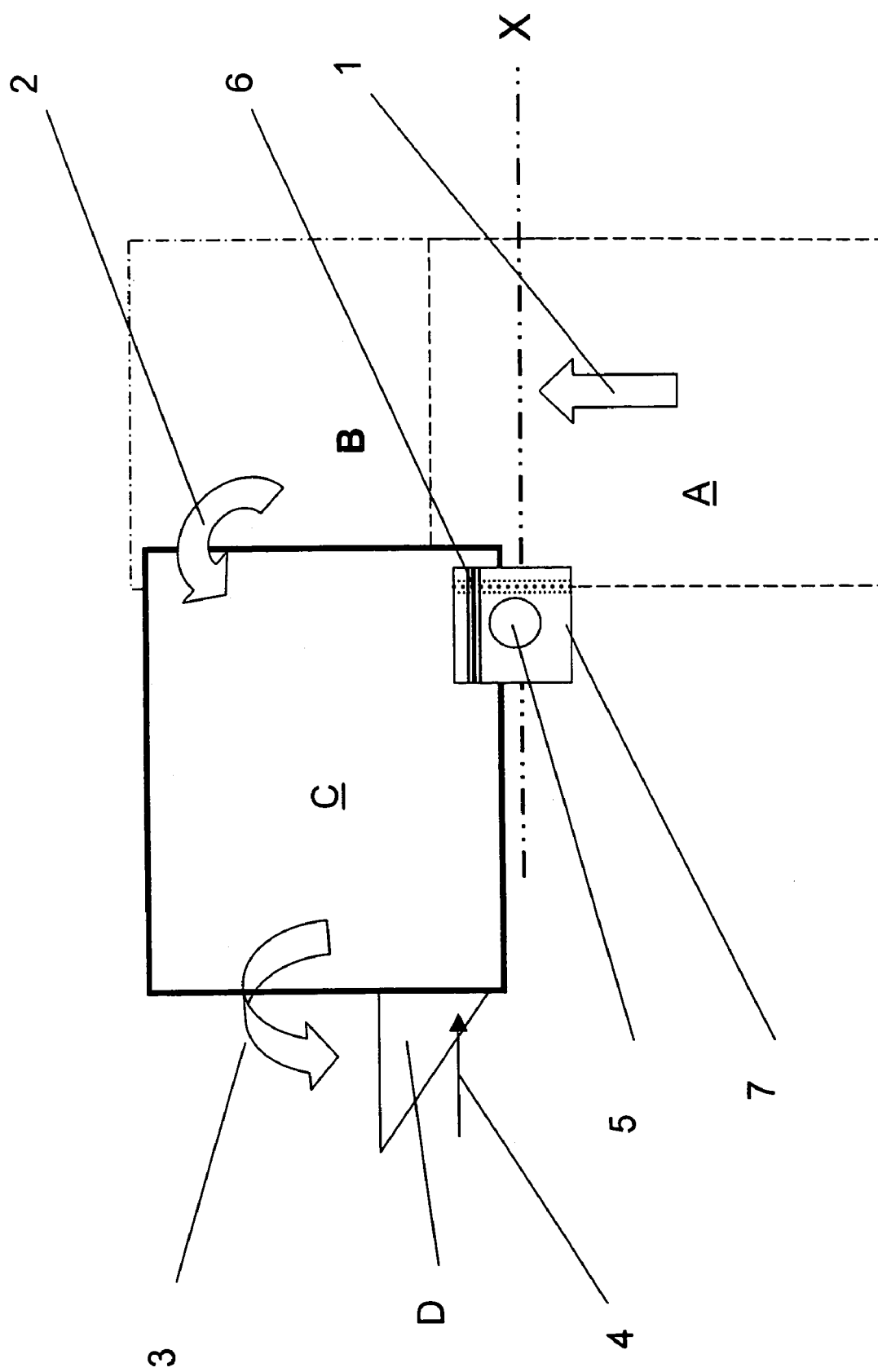
FIG. 1 the functioning principle of the collapsible table arrangement according to the invention shown roughly schematically, FIG. 2 a simplified cross-section through the swivel hinge of the invention with the horizontal collapsible table, FIG. 3 the swivel hinge of the invention according to FIG. 2 with the vertically swivelled collapsible table, and FIG. 4 the rotary swivel fitting of the collapsible table arrangement according to the invention in an exploded view.

FIG. 1 shows initially in a very rough simplified illustration the functioning principle of the collapsible table arrangement according to the invention with the various steps in setting up.

The mechanism of the collapsible table arrangement will be explained later in more detail. The indicated table board is labelled with A–D in the various set-up positions illustrated in FIG. 1. In the rest position A the table board drawn dashed is in its completely lowered position, for example inside a multifunction box, the upper edge of which is indicated with X. The table board is drawn out upwards to set up the table from the position A in the arrow direction 1 in a guide, indicated dashed at 6, of the swivel hinge indicated at 7, the formation of which will be described in more detail later, until a stop on the table limits the displacement movement in the position B illustrated dotted and dashed. Then the table board located in the position B is swivelled by 90° about the rotational axis 5, orientated perpendicular to the plane of the drawing, in the arrow direction 2, whereby the table board reaches the position C drawn with full lines. By folding the table board by 90° (from the drawing plane to the rear) into the position D, the table board reaches its horizontal usage position. By moving the table board in the guide 6 (indicated here with full lines) of the profile claws in the arrow direction 4, the collapsible table and its position can be adapted to the user's requirements.

The table is taken down in the reverse sequence. First, the table board in position D is moved within the profile claw 6 against the arrow direction 4 (in the drawing) to the left until a stop on the table board is reached and then it is swivelled upwards into position C. Then the table board is moved upwards from position C by 90° about the rotational axis 5 until it reaches position B. By lowering the board within the profile claw 6 against the arrow direction 1, it reaches the rest position A below the opening X, for example a multi-function box.

Figure 3:
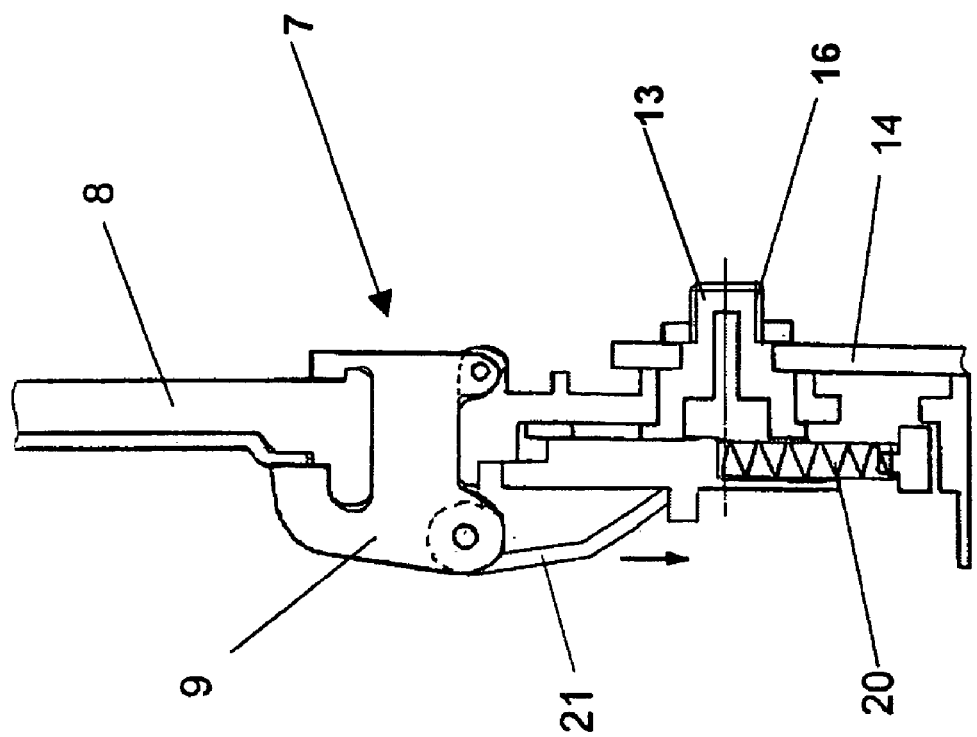
Figure 2:
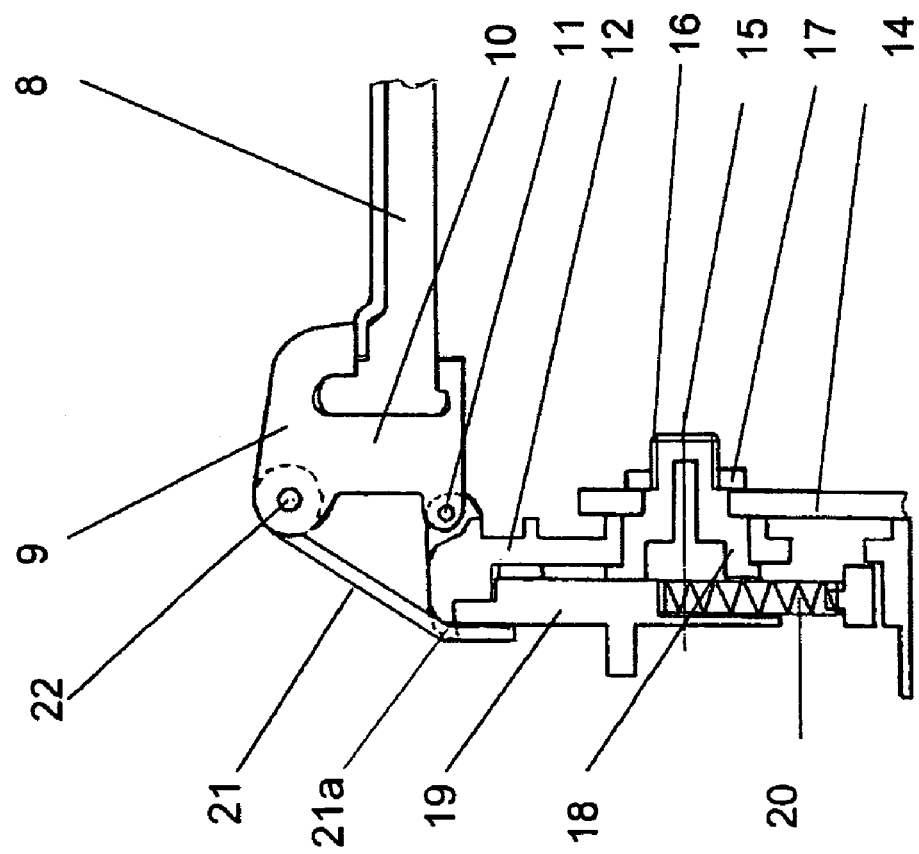

A swivel hinge for application according to the invention is schematically illustrated in FIGS. 2 and 3. The figures differ only due to the swivel position of the table board 8, which is swivelled horizontally in FIG. 2 and vertically in FIG. 3. The table board 8 is held clamped in the profile claw 9 and is guided in it to be movable perpendicular to the drawing plane. In addition the table board labelled here with 8 can be swivelled into the vertical position, shown in FIG. 3, about a swivel axis 11 running parallel to the table edge 10 enclosed by the profile claw. The swivel axis 11 connects both of the parts of the swivel hinge 9, one part of which is formed by the profile claw itself and the other part of which is formed on the pot-shaped rotary part labelled with 12, which can be rotated about the rotational axis 15 running horizontally in the drawing plane transverse to the swivel axis 11 in the plane of the drawing. The rotary part is supported in a fixed part 18, which is firmly connected to the housing indicated at 14. The fixed part 18 is essentially formed disc-shaped and engages the rotary part 12 with a shaped pivot 13. The pivot 13 carries a thread 16, on which the nut 17 is screwed for the axial attachment of the rotating part 12 of the rotary device on the fixed part 18. Within the fixed part 18 of the rotary device the bar illustrated at 19 can be moved in its longitudinal direction and pressed by the spring 20 against the inner side of the pot-shaped rotating part 12. Here, a recess is positioned such that the bar latches into it in the swivel position of the swivel hinge corresponding to the usage position of the table and fixes the swivel hinge in this position. The swivel hinge itself is covered by the tensile panel 21 which is held at 22 on the profile claw 9. The tensile panel 22 acts as the abutment for the freely projecting collapsible table in that the tensile panel hooks into the cams indicated at 21a which are formed on the part 12. The cams 21a pass through openings in the tensile panel 21 in the usage position of the table and thereby hold it in position such that the tensile panel firmly hooks automatically under the cams. On their upper facing side, the cams are formed such that on folding up the table board 8, the tensile panel is pushed over the cams and consequently released. During the further movement of the table board upwards, the tensile panel presses the bar 19 downwards in that it is positioned on the protrusion on the bar 19 so that the bar 19 is pressed downwards against the spring and is released from the rotating part 12 when the table board 8 has reached its vertical position. It is only in this position that the swivel movement about the axis 15 is initiated, with which the table board can be lowered into its rest position.

Figure 4:
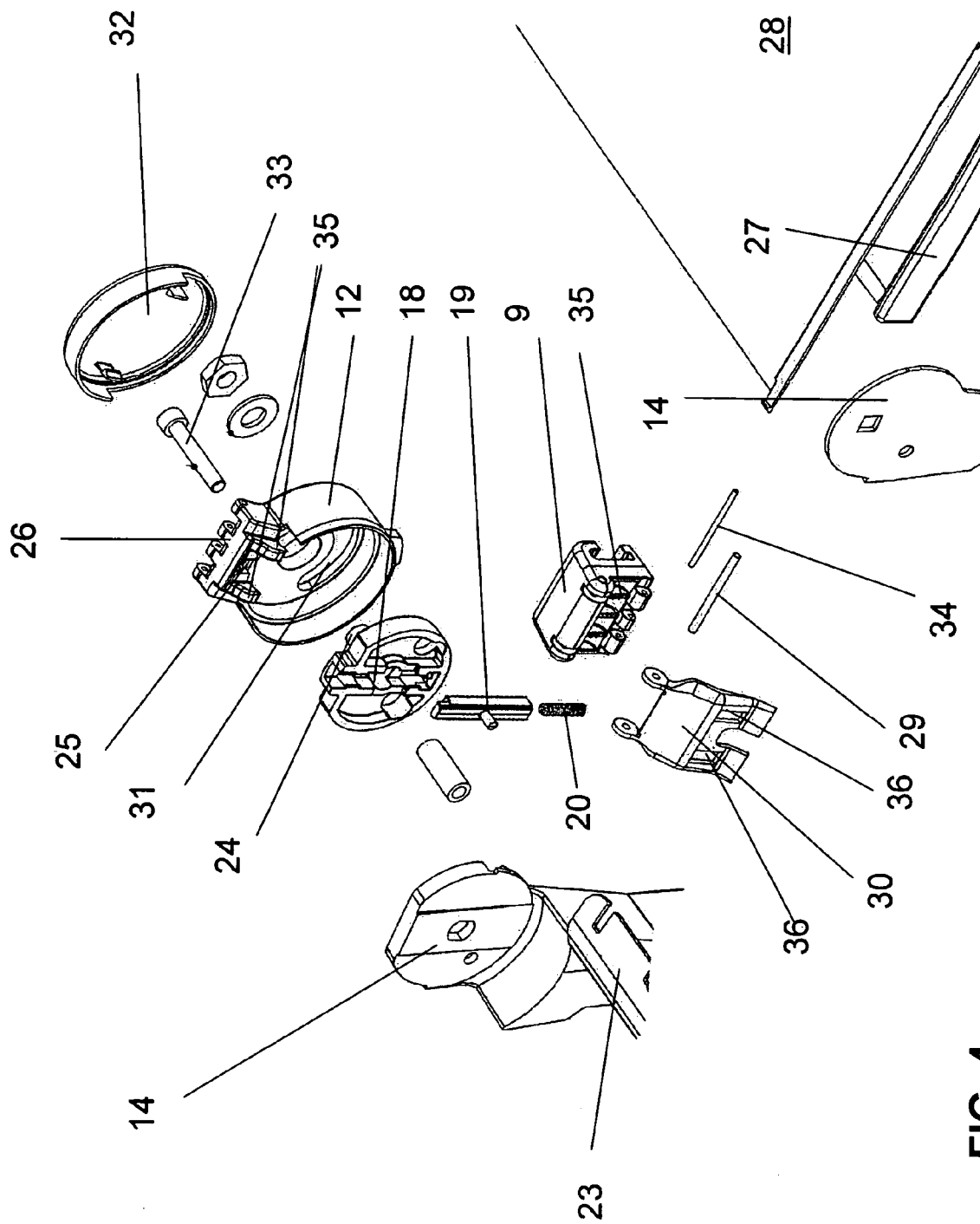

To further explain the structure of the invention, the individual parts of the device according to the invention are shown in FIG. 4 in an exploded illustration. The fixed part 18 of the rotary part is recognisably attached to the housing part 14, which housing part 14 is realised on the frame 23 strengthening a multifunction box. The part 18 engages the pot-shaped rotational part 12 with a pivot indicated at 24 and the front part of the pivot then engages through the flattened hole recognisable in part 14 from left to right and is held on the side facing away by the recognisable, but unlabelled nut. A bar 19 with the spring 20 is guided in the fixed part 18 in its longitudinal direction and engages a recess 25 on part 12 in a certain rotational position of the rotating part.

The screw indicated at 33 penetrates the pot-shaped rotating part 12 in the region of a groove 31 running in the bottom in the circumferential direction and, during the rotation of the rotating part 12, forms an end stop for the rotational movement on both sides of the groove. The profile claw 9 forms one part of the swivel hinge recognisable in FIGS. 2 and 3, the other part of which is formed on the rotating part 12, as can be seen at 26. The two hinge parts are held together by the axle 34.

The profile claw 9 can be seen and is C-shaped in cross-section, gripping the profile 27 on the collapsible table 28. In the illustrated example, the collapsible table 28 is illustrated with a thin board on a strong frame, but can just as well consist of a one-part shaped board. Between the profile claw 9 and the profile 27 there is adequate play to enable the table 28 to be pushed along the profile 27 in the longitudinal direction. The tensile panel, which acts as an abutment for the freely projecting collapsible table, is shown at 30. The tensile panel 30 is supported on the profile claw 9 for swivelling about the axis 29 and in the mounted state overlaps the part 26 of the swivel hinge formed on the rotating part 12. On this part 26 two cams 35 are also formed which in the usage state of the table 28 penetrate the openings 36 in the tensile panel 30, whereby the tensile panel 30 hooks into the cams 26, as described for FIG. 3. In the set-up state of the table 28 the tensile panel 30 is moved downwards so that the recess 37 presses the protrusion 38 on the bar 19 downwards against the action of the spring 20 and the bar 19 is pressed out of the recess 25 on the part 12. The rotary device is covered on the outer side by the cover 32 and on the inner side the rotary device is closed off by the cover 14.

REFERENCE LIST

1 Withdrawal direction for setting up
2 Rotational direction for swivelling
3 Folding direction on the horizontal
4 Movement direction
5 Rotational axis
6 Guide
7 Swivel hinge
8 Table board
9 Profile claw
10 Edge
11 Swivel axis
12 Rotating part
13 Pivot
14 Housing
15 Rotational axis
16 Thread
17 Nut
18 Fixed part
19 Bar
20 Spring
21 Tensile panel
22 Attachment for tensile panel
23 Frame
24 Pivot
25 Recess
26 Part of the swivel hinge
27 Profile
28 Collapsible table
29 Axis for tensile panel
30 Tensile panel
31 Groove
32 Cover
33 Screw
34 Hinge axis
35 Cam
36 Opening in tensile panel 37 Recess in tensile panel
38 Protrusion on bar

What is claimed is:

1. Collapsible table arrangement for vehicles, in which the collapsible table (28) can be drawn out of a vertically orientated rest position, in particular within a multifunction console between the outer rear seats of a car and can be unfolded into its horizontally orientated usage position, characterised by a swivel hinge, comprising a profile claw (9) gripping around an edge of a table board (8), the profile claw being attached to a rotary device for swivelling about a swivel axis (11, 34), orientated parallel to the edge (10) gripped around by the profile claw (9), through an angle of approximately 90°, with the aid of which the profile claw (9) together with the table board (28) can be rotated through a rotational angle of approximately 90° about an essentially horizontal rotational axis (15), orientated transverse to the swivel axis (11, 34) of the profile claw (9).

2. Collapsible table arrangement according to claim 1, characterised in that the table board (28) within the profile claw (9) and parallel to the swivel axis (11, 34) can be steplessly moved between two end positions.

3. Collapsible table arrangement according to claim 1, characterised in that the rotary device comprises two coaxially arranged parts (12, 18), consisting of a fixed part (18) attached to a frame (23) joined to a vehicle and a rotary part (12) that can be rotated with respect to the fixed part (18) about a common horizontal central axis (15), whereby rotational movement of the rotary part (12) is limited by end stops in the fixed part (18).

4. Collapsible table arrangement according to claim 3, characterised in that the rotary part (12) has a pot-shaped form and is guided with its inner circumference on an outer circumference of the fixed part (18) and on a central pivot (13) formed on the fixed part and penetrating the rotary part.

5. Collapsible table arrangement according to claim 4, characterised in that one part (26) of a swivel hinge formed together with the profile claw (9) is formed on an outer circumference of the rotary part (12) and at a bottom of the fixed part (18), a groove (31) is provided and is orientated with a constant radial distance to the rotational axis, the circumferential extent of the groove corresponding to a rotational angle of the rotary part (12) and being penetrated by a pivot (screw 33) provided on the fixed part in such a way that the pivot screw (33) with ends of the groove (31) forming the two end stops for rotational movement of the rotary part (12).

6. Collapsible table arrangement according to claim 3, characterised in that a radially interlock bar (19) is provided on a part selected from the group consisting of the fixed part (18) and the movable part (12), the bar (19) being movable against spring pressure (20), the interlock bar latching in a blocking manner into an appropriate recess (25) on the part (12 or 18) when the rotary device has reached a specified rotational position.

7. Collapsible table arrangement according to claim 6, characterised in that a tensile panel (30) is supported for swivelling on the profile claw (9) about an axis (29) running parallel to the swivel axis (11, 34), and the swivel hinge (7) protrudes in an overlapping manner into a region of the rotary device, where the tensile panel (30) hooks into an abutment provided on the rotary device in a usage position of the table (28), thereby forming a tensile link as an abutment for the collapsible table (28).

8. Collapsible table arrangement according to claim 7, characterised in that the tensile panel (30) has at least one recess (36) which grips behind a cam (35) formed on the swivel hinge when the collapsible table (28) is folded into its usage position.

9. Collapsible table arrangement according to claim 8, characterised in that the tensile panel (30) is moved from its latching position on lifting the table (28) by means of a guide surface formed on the cam (35).

10. Collapsible table arrangement according to claim 7, characterised in that the interlock bar (19), movable radially against spring pressure (20), can be unlatched by the tensile panel (30) when the table (28) is swivelled upwardly.

11. Collapsible table arrangement according to claim 1, characterised in that the swivel hinge (7) is arranged on a multifunction box between two seats of a car and one or more tables (28) can be lowered in a vertical position between a housing of the multifunction box and a compartment formed within the multifunction box.

12. Collapsible table arrangement according to claim 11, characterised in that the multifunction box is arranged between the outer rear seats of a car and the one or more tables (28) can be brought out after opening an armrest that closes the multifunction box.

13. Collapsible table arrangement according to claim 11, characterised in that each of the one or more tables (28) is divided into two and can be brought by a folding mechanism into a position corresponding to a rest position in which halves of the one or more tables, lying closely one above the other, can be folded away.

* * * * *